(12) United States Patent  (10) Patent No.: US 12,092,772 B2
Petringa et al.  (45) Date of Patent: Sep. 17, 2024

(54) SILICON CARBIDE BASED DOSIMETRY DETECTOR

(71) Applicant: ISTITUTO NAZIONALE DI FISICA NUCLEARE (INFN), Frascati (IT)

(72) Inventors: Giada Petringa, Frascati (IT); Salvatore Tudisco, Frascati (IT); Giuseppe Antonio Pablo Cirrone, Frascati (IT)

(73) Assignee: ISTITUTO NAZIONALE DI FISICA NUCLEARE (INFN), Frascati (IT)

( * ) Notice: Subject to any disclaimer, the term of this patent is extended or adjusted under 35 U.S.C. 154(b) by 85 days.

(21) Appl. No.: 17/918,297

(22) PCT Filed: Apr. 12, 2021

(86) PCT No.: PCT/IB2021/052994
§ 371 (c)(1),
(2) Date: Oct. 11, 2022

(87) PCT Pub. No.: WO2021/209877
PCT Pub. Date: Oct. 21, 2021

(65) Prior Publication Data
US 2023/0184964 A1  Jun. 15, 2023

(30) Foreign Application Priority Data
Apr. 14, 2020 (IT) .................. 102020000007780

(51) Int. Cl.
*G01T 1/02* (2006.01)
*G01T 1/29* (2006.01)

(52) U.S. Cl.
CPC ............ *G01T 1/026* (2013.01); *G01T 1/2914* (2013.01)

(58) Field of Classification Search
CPC ............................ G01T 1/026; G01T 1/2914
See application file for complete search history.

(56) References Cited

U.S. PATENT DOCUMENTS 4,357,536 A * 11/1982 Varma .................. G01T 1/29
250/397
5,665,971 A * 9/1997 Chen .................. G01T 1/2907
250/361 R (Continued)

FOREIGN PATENT DOCUMENTS

EP    2857867 A2    4/2015
WO  2016007599 A1   1/2016

OTHER PUBLICATIONS

Giada Petringa et al: "First characterization of a new Silicon Carbide detector for dosimetric applications", 15th Topical Seminar On Innovative Particle and Radiation Detectors (IPRD 19), Oct. 17, 2019 (Oct. 17, 2019).

(Continued)

*Primary Examiner* — Hugh Maupin
(74) *Attorney, Agent, or Firm* — Volpe Koenig

(57) ABSTRACT

The invention relates to a detector of charged particles made of silicon carbide and capable of performing dosimetric measurements in the field of quality controls of the beam lines at proton-therapy centres. With such detector it is further possible to perform measurements on beams of high-intensity charged particles produced by laser-matter interaction.

13 Claims, 5 Drawing Sheets

(56) References Cited

U.S. PATENT DOCUMENTS

| | | | |
|---|---|---|---|
| 2008/0023644 A1* | 1/2008 | Pedroni | A61N 5/1043 |
| | | | 250/396 ML |
| 2010/0171504 A1* | 7/2010 | Nichiporov | G01T 1/2935 |
| | | | 324/464 |
| 2011/0127437 A1* | 6/2011 | Wrbanek | G01N 15/02 |
| | | | 250/370.01 |
| 2011/0133071 A1* | 6/2011 | Bashkirov | G06F 30/20 |
| | | | 250/281 |
| 2012/0025076 A1* | 2/2012 | Kraft | A61N 5/1049 |
| | | | 250/307 |
| 2013/0221213 A1* | 8/2013 | Takayanagi | A61N 5/1075 |
| | | | 250/252.1 |
| 2014/0088401 A1* | 3/2014 | Cai | H01L 27/14 |
| | | | 600/407 |
| 2015/0099918 A1* | 4/2015 | Takayanagi | A61N 5/1071 |
| | | | 702/89 |
| 2015/0306427 A1* | 10/2015 | Hirasawa | G01T 1/204 |
| | | | 250/363.08 |
| 2016/0245929 A1* | 8/2016 | Bashkirov | G01T 1/16 |
| 2017/0203127 A1* | 7/2017 | Dolney | A61N 5/1075 |
| 2020/0197730 A1* | 6/2020 | Safavi-Naeini | G21G 4/02 |

OTHER PUBLICATIONS

Coutrakon G et al: "Microdosimetry spectra of the Lorna Linda proton beam and relative biological effectiveness comparisons", Medical Physics, AIP, Melville, NY, US, vol. 24, No. 9, Sep. 1, 1997 (Sep. 1, 1997).

* cited by examiner

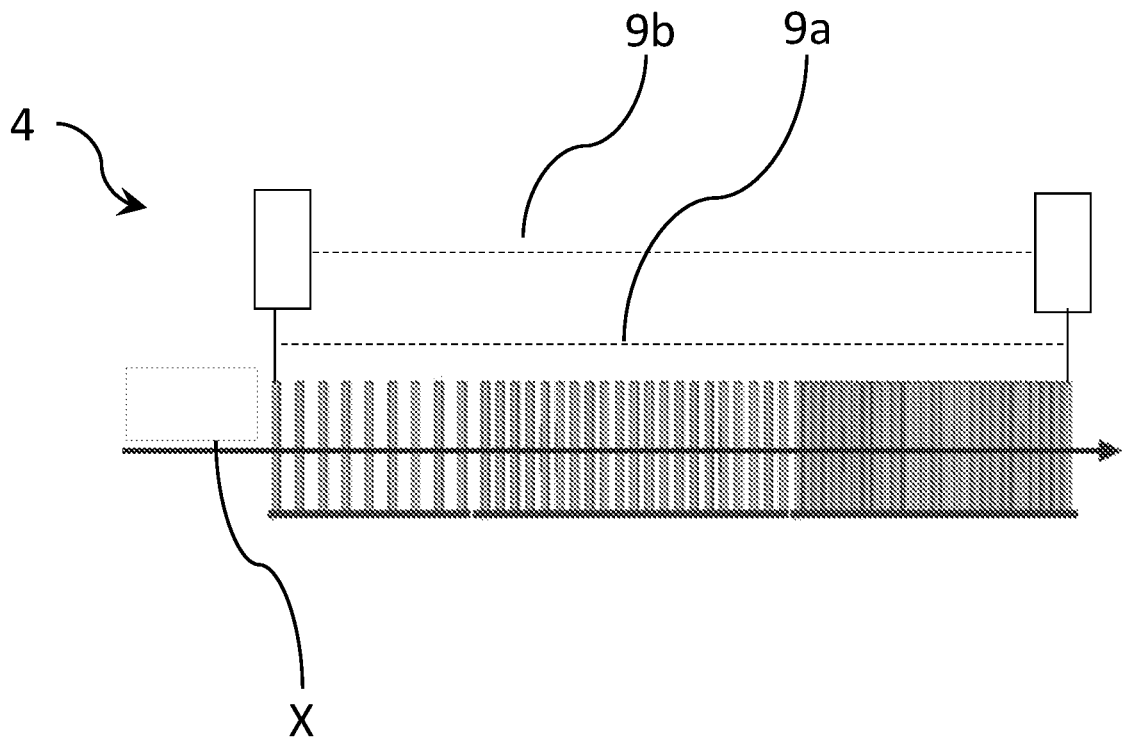
Fig. 2
Fig. 3
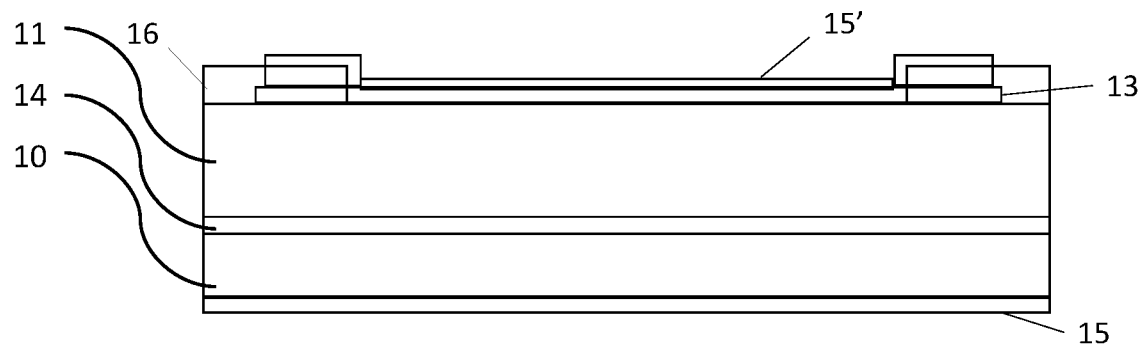

SILICON CARBIDE BASED DOSIMETRY DETECTOR

TECHNICAL FIELD OF THE INVENTION

The present invention generally relates to a detector of a beam of charged particles made of silicon carbide, in particular for dosimetric measurements, for example useful in quality controls of the beam lines at proton-therapy centres. Among the other possible applications, with such detector it is further possible to perform measurements on beams of high-intensity charged particles produced by laser-matter interaction.

STATE OF ART

A dosimetry detector is a measurement instrument capable of performing measurements related to the type and/or to the dose of ionizing radiations. Under ionizing radiations, the type of radiations interacting with matter is meant, by generating the ionization of the atoms and/or of the molecules of the medium receiving the radiations. An example of ionizing radiation is constituted by a beam of charged particles, such as for example protons.

Such type of ionizing radiations can be used in radiobiological applications where the receiving medium consists of tissues and/or cellular systems of a living system.

The physical characterization of a clinical beam of ionizing radiations used for radiotherapy is performed by means of particular detectors capable of providing a direct or indirect measurement of the absorbed radiation dose and/or of the radiation type.

Generally, the operation of the dosimetry detectors is based upon the principle thereby an ionizing radiation striking on an active surface (hereinafter also area) produces a certain amount of charge which, once collected and analysed, allows to extract a signal useful to the quantitative and qualitative characterization (type of radiation) of the radiation which interacted with the detector.

Examples of dosimetry detectors are the so-called ionization chambers and the solid-state detectors made of silicon and/or diamond. These examples have some drawbacks thereamong, in particular, a poor resistance to damage by radiation and a poor accuracy in applications of micro-dosimetric type.

One of the major peculiarities of the ionizing radiations lies in the discrete character of the mechanisms regulating their interaction with the matter of the receiving medium and, consequently, the energy storage. The dose is a macroscopic magnitude defined as the ratio of energy dE released by the ionizing radiation in a medium with mass m: $D=dE/dm$ [Gy]. Such dosimetric magnitude, which depends upon volume and density of the receiving medium, however, does not keep into consideration the stochastic fluctuations in the release of radiation energy on a cellular or sub-cellular scale and, although effective in first approximation, it is not an optimum parameter for the purpose of studying the radiobiologic effect.

On such cellular or sub-cellular scale in fact volumes of the receiving medium on micrometric and nanometric scale are considered, wherein there are low local dose deposits due to particles with high LET (Linear Energy Transfer), defined as energy released by the particles in a linear path in the receiving medium $LET=dE/dx$ [keV/μm], therefore the dose magnitude as defined above, necessarily resulting from an average or integration of the energy released in a medium with mass m, does not provide sufficiently detailed information about the interaction of the radiation at cellular or sub-cellular level.

In such context, the need is particularly felt for introducing measurement devices and methods capable of describing more accurately, both in quantitative and qualitative terms, the energy local deposits resulting from the application of ionizing radiations in smaller scale regions than those which are generally of interest in radiotherapy. The study of such magnitudes indeed concerns micro-dosimetry.

Micro-dosimetry then deals with studying the effect of the ionizing radiations on a receiving medium of micro and/or nanometric scale. In particular, micro-dosimetry tries to quantify the energy local deposits by correlating them to the biological effects observed on the complex cellular systems and by introducing new magnitudes and specific physical concepts such as, for example, the mentioned LET, which allows to characterize radiation in terms of local energy deposit in the medium thickness.

A limit common to the detectors currently available on the market for the dose reconstruction in depth with beams of charged particles relates to spatial resolution; for example, the multilayer chambers have a resolution amounting to the millimetre.

Another limit of the available technologies relates to the resistance to radiation damage: in fact, the silicon detectors and the scintillation ones are subjected to said damage as well as the ionization chambers which show recombination phenomena if used in environments with highly intense beams of particles as well as those used in proton-therapy and/or beams of particles produced by laser-matter interaction.

Both the International patent application N. WO 2016/007,599 A1 and the European patent application N. EP 2,857,867 A2 describe a respective dosimetric detector with a main body, partially transparent to a beam of charged particles, containing a plurality of detectors connected to a respective reading system. The main body is filled up with a low-density gas, without adjusting the pressure thereof; the selected gases are Hydrogen, air, Argon, $CO_2$.

Then, the technical problem of making available an improved detector arises, which has to solve or at least attenuate the mentioned problems of the art and in particular which is capable of providing a signal allowing to measure the released dose thereof, preferably even for applications wherein one works on thicknesses and/or volumes of the receiving medium of micrometric scale, and with a high resolution along the whole longitudinal extension of the detector.

In the context of this problem, it results preferable that the detector could be produced easily and cheaply and it could be used easily in dosimetry and/or micro-dosimetry, in particular for radiobiological applications.

An additional desirable aspect is that the detector should have good resistance to the radiation damage.

Moreover, the technical problem of implementing a measurement instrument arises, capable of providing a reliable and repeatable measurement of the released dose.

SUMMARY OF THE INVENTION

The invention consists in a detector of charged particles comprising a plurality of detection units placed in series along the axis X which corresponds to the propagation direction of a beam of charged particles, as defined in the enclosed claim 1.

The invention further consists in one or more methods of using said detector, with the purpose of obtaining information of interest about the charged particles interacting therewith under different operating conditions.

According to a preferred embodiment of the present invention, the dosimetry detector of charged particles comprises a main body, preferably made of aluminium or analogous materials, extending longitudinally along a main direction represented by an intermediate longitudinal axis X of the detector which, in turn, has a portion the surface thereof is transparent to a beam of charged particles, so as to allow the passage of a beam of particles through the main container.

Moreover, this detector of charged particles provides the presence of at least ten detection units which are made of silicon carbide and which are arranged in series along the axis X.

In this way, the beam of particles passing through the transparent surface portion of the above-mentioned main body continues its path coming across, along the propagation direction, the longitudinally distributed detection units.

Moreover, this detector of charged particles comprises a system for reading the signal produced by said detection units, which in turn comprises a plurality of electric connection elements, each one connected to a respective detection unit, and analysis modules which acquire the charge signal recorded by each detection unit, by processing the relative dose distribution.

According to a preferred embodiment of the present invention, in the dosimetry detector of charged particles the main body is provided with two openings which are adapted respectively to inlet and outlet a specific filling gas of the main body, the function thereof is to modify the capability of attenuating the ionizing radiation inside the volume constituted by the main body. Such openings are advantageously connected to a variable pressure flow system therewith the pressure of the gas inside the main body is made to vary, allowing the variation of the spatial resolution of the above-mentioned reading system.

Such peculiarity makes the detector according to the present invention suitable to measurements with sub-micrometric samplings. The latter are to be considered extremely important in the reconstruction of the distal portion of the dose distribution curve in depth of charged particles, such as for example protons and ions.

Under above-mentioned conditions, the range of maximum variation of the dose gradient amounts to hundreds of pm, and therefore it is extremely important to perform a lower sampling than the above-mentioned range.

According to a preferred embodiment of the present invention, said specific filling gas is a tissue-equivalent gas.

According to a preferred embodiment of the present invention, said tissue-equivalent gas has a density of at least 2,00 $kg/m^3$.

According to a preferred embodiment of the present invention, said tissue-equivalent gas is dimethyl-ether.

According to another preferred embodiment of the present invention, said tissue-equivalent gas is propane.

According to an additional preferred embodiment of the present invention, said tissue-equivalent gas has a density higher than 4,93 $kg/m^3$.

The above-mentioned densities can be obtained and kept constant by acting on the pressure of the filling gas of the main body, thanks to the above-mentioned flow system which is capable of obtaining and keeping constant a pre-established pressure inside the filling body.

BRIEF DESCRIPTION OF FIGURES

More details could be taken from the following description of not limiting embodiment examples of the subject matter of the present invention, performed with reference to the enclosed drawings, wherein:

FIG. 2: shows a schematic representation, seen in section, of the main body of the detector and of the signal reading system;

FIG. 3: shows a schematic representation, seen in section, of a detection unit made of silicon carbide;

DETAILED DESCRIPTION OF THE INVENTION

Figure 1:
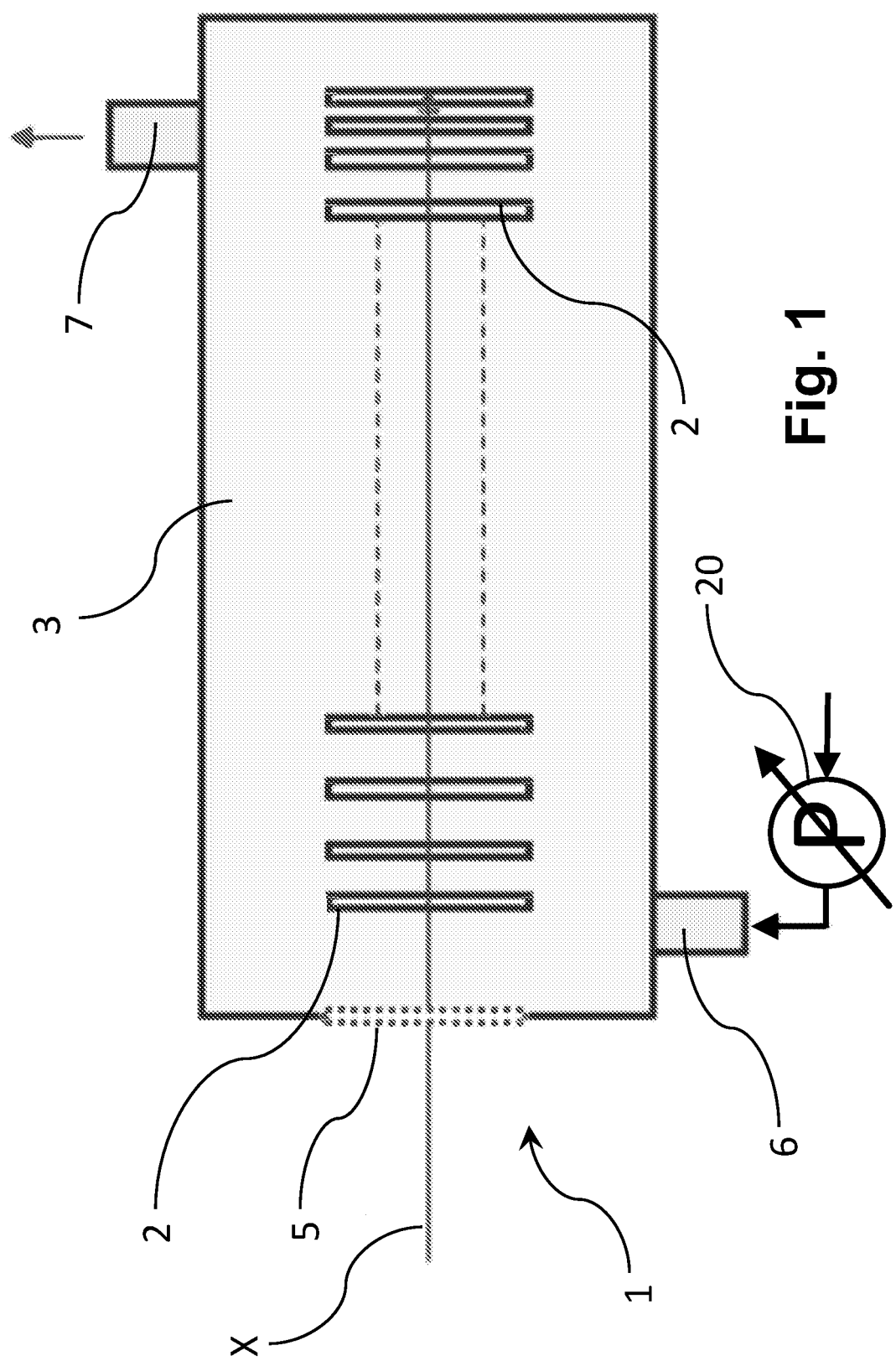
FIG. 1: shows a schematic representation, seen in section, of the main body of the detector according to the invention.

By way of example, reference is made to a detector of charged particles of the invention capable to operate with beams of monoenergetic charged particles with energy equal or higher than 5 MeV.

To the purpose of the following description protons, ions and electrons are examples of charged particles.

Such detector 1 comprises a main body 3 having a main dimension, which extends longitudinally along an intermediate longitudinal axis, identified hereinafter as axis X.

The main body 3 includes a plurality of detection units 2 made of silicon carbide which are arranged in series to each other along the axis X, said detection units 2 being electrically connected to a system for reading the signal 4 which will be detailed hereinafter with reference to FIG. 2.

The main body 3 can be made of a material selected from aluminium or any other material with analogous chemical-physical features or mixtures thereof. Aluminium represents a preferred use solution.

The main body 3 comprises at least a portion 5 of container, the surface thereof being transparent to the beam of charged particles, so as to allow the passage of the beam of particles therethrough, and so that the beam then continues its path coming across, along the propagation direction, the plurality of above-said detection units 2.

In a preferred embodiment, the main body 3 is provided with two openings 6, 7 adapted respectively to inlet and outlet a gas, hereinafter called filling gas.

The above-described main body 3 is then arranged to be connected to a flow system 20 in order to adjust the pressure of the filling gas therewith the main body 3 is filled up (FIG. 1), by allowing to perform controlled pressure conditions inside thereof which determine a certain predetermined density of the filling gas, and generally by keeping constant the pressure inside the main body 3 during the measurement time.

Advantageously, the filling gas is selected so as to be a so-called tissue-equivalent gas (ICRU Report 36, 1983). An example of tissue-equivalent filling gas, usable to the purpose of the present invention is dimethyl-ether, which has a density at standard pressure slightly higher than 2,00 kg/m$^3$.

The function performed by the filling gas is to modify, thanks to its own density, the capability of attenuating the ionizing radiation inside the volume constituted by the main body, since the pressure variation of the insertion gas allows to vary the spatial resolution of the above-described reading system.

In other words, under conditions of more pressure inside the main body 3, or with a pressure value which produces a density of the selected tissue-equivalent gas of at least 2,00 kg/m$^3$, it is possible to reconstruct, with the same detector, the distribution of the dose released by more energetic beams of charged particles than what it would happen at atmospheric pressure.

The energy of the interacting particles being equal, by acting on the pressure in fact it is possible to sample the dose distribution at different depths: at higher pressures the shifting of the dose distribution curve at lower depths along the axis X is observed.

Such peculiarity makes the detector adapted to measure with sub-micrometric samplings which are extremely important in the reconstruction by the distal portion of the dose distribution curve in depth of charged particles such as protons and ions.

Under above-mentioned conditions, the range of maximum variation of the dose gradient amounts to hundreds of pm, and therefore it is extremely important to perform a lower sampling than the above-mentioned range.

By way of example Table 1 shows the result obtainable in a range of energy of clinic protons (from 1 MeV to 150 MeV) by inserting a gas at variable pressure.

TABLE 1

| Pressure | Incident proton energy | Spatial resolution |
|---|---|---|
| 4.5 kPa | 1 MeV-150 MeV | 0.088 μm-0.072 μm |
| 45.4 kPa | 1 MeV-150 MeV | 0.89 μm-0.73 μm |
| 454 kPa | 1 MeV-150 MeV | 8.82 μm-7.32 μm |
| 4540 kPa | 1 MeV-150 MeV | 88.12 μm-72.32 μm |

In particular, the configuration obtainable by positioning the detectors at a distance therebetween equal to 0.9 mm, and by inserting inside the central body propane gas, which is known in clinical applications as tissue-equivalent gas.

A variation in different orders of magnitude in the distance between the detectors, and then in the spatial sampling, results clearly. The above-mentioned result is evident even from the variation in the range 150 MeV of protons made of propane at variable pressure: between 4.5 KPa and 4500 kPa in fact a variation between 1.93 km and 1.93 m is observed.

By making use of gases having higher densities than propane, which at standard pressure has a density of 4.93 kg/m$^3$, such as for example Xenon, it is possible, even by varying suitably the pressure in the main body 3, to cover still wider sampling ranges, from hundreds of nanometres (nm) until hundreds of millimetres (mm).

A wider sampling variation range makes the system versatile to the energy changes of the incident particles. Then, by fixing the number of detection units 2 and by varying the pressure inside the main body 3, thanks to the flow system 20 it is possible to perform a dose distribution measurement in depth under conditions of incident energy varying from few MeV until hundreds of MeV.

The plurality of detection units 2 consists of at least ten units. In fact, a lower number of units would not allow a correct reconstruction of the dose distribution along the axis X.

By way of example each detection unit 2 is characterized by an active area ranging from 1 mm$^2$ to 25 cm$^2$; the thickness of each one of them varies from 1 to 100 micrometres. In a preferred embodiment of the invention, the detection unit 2 comprises an active area comprised between 100 mm$^2$ and 400 mm$^2$.

The distance between two consecutive detection units 2 can be the same for all adjacent units or it can vary, two by two, depending upon the position along the axis X. By pure way of example, consecutive detection units 2 can be at gradually lower distance along the propagation direction of the radiation (or axis X) as shown in FIG. 1.

Such configuration results to be particularly advantageous since the region characterized by a higher density of detection units 2 presumably corresponds to the depth at which a higher charge amount is released: by increasing the density of the samplings the Bragg curve is reconstructed more effectively.

The minimum distance between a detection unit 2 and the subsequent one corresponds to the thickness of PCB (Printed Circuit Board) thereon the elements constituting the same detection unit are mounted, and then it amounts to few millimetres.

Therefore, the detection units 2 are placed at a distance from each other going from a minimum of few millimetres to a maximum of tens of centimetres. The maximum distance is established according to the wished spatial resolution to the purpose of the reconstruction of the dose distribution in depth: the person skilled in the art is capable of determining the optimum number and position of the detection units 2 depending upon the operating conditions of the measurement to be performed.

Each detection unit 2 comprises the following elements:
- a substrate of silicon carbide 10 having two main dimensions to form one first and one second face, the substrate being characterized by an n-type doping;
- an epitaxial layer 11 characterized by n$^-$-type doping placed at said first substrate face 10 and having a thickness comprised between 10 μm and 100 μm and with a dopant concentration amounting to 5–8·10$^{13}$/cm$^3$;
- a layer 13 characterized by p+-type doping placed on said epitaxial layer 11 having a thickness comprised between 0.2 μm and 1 μm and a dopant concentration amounting to 10$^{18}$–10$^{19}$/cm$^3$;
- a layer 14 characterized by n+-type doping interposed between the substrate 10 and the epitaxial layer 11, adapted to the electric contact therebetween, having a thickness comprised between 0.2 μm and 1 μm and a dopant concentration amounting to 10$^{18}$/cm$^3$; and
- two metal layers 15, 15', preferably made of aluminium, with thickness comprised between 0.05 μm and 0.1 μm respectively on the second substrate face 10 and above the layer 13, characterized by p+-type doping.

In a variant of the invention, the above-listed elements can be characterized by a different configuration of the doped layers without compromising the operation of the detector.

In such case, the single detection unit comprises:
- a substrate of silicon carbide 10 having two main dimensions to form one first and one second face, the substrate being characterized by a p-type doping;
- an epitaxial layer 11 characterized by p--type doping placed at said first substrate face 10 and having a thickness comprised between 10 μm and 100 μm and with a dopant concentration amounting to 5–8·10$^{13}$/cm$^3$;

a layer 13 characterized by n+-type doping placed on said epitaxial layer 11 having a thickness comprised between 0.2 µm and 1 µm and a dopant concentration amounting to $10^{18}$–$10^{19}$/cm$^3$;

a layer 14 characterized by p+-type doping interposed between the substrate 10 and the epitaxial layer 11, adapted to the electric contact therebetween, having a thickness comprised between 0.2 µm and 1 µm and a dopant concentration amounting to $10^{18}$/cm$^3$;

two metal layers 15, 15', preferably made of aluminium, with thickness comprised between 0.05 µm and 0.1 µm respectively on the second substrate face 10 and above the layer 13 characterized by n+-type doping.

The substrate of silicon carbide can be made of silicon carbide 4H or, alternatively, of silicon carbide 6H. The function performed by the substrate 10 is to provide a mechanical support in implementing the single detection units and, in particular, to allow the epitaxial growth of the layer 13. The substrate at issue generally has a thickness comprised between 5 µm and 400 µm.

In the configuration described first, the metallic layers 15, 15' constitute the cathode and the anode, respectively; in the reversed polarization configuration, on the contrary, they constitute the anode and the cathode.

FIG. 2 further shows a layer 16 made of silicon oxide which is a residual of the photolithographic process with which the layer 13 is obtained and, moreover, it performs a function of insulating the elements constituting the detection unit 2.

A beam of particles interacting with the detector 1 of the invention, upon passing through the transparent portion 5 of the main body 3, interacts consequentially with the detection units 2. The interaction of the beam of charge particles with the detection units 2 causes, in each one of them, a deposit of charge proportional to the signal which one wants to measure. The signal of charge deposited in each detection unit 2 varies depending upon the position of said units 2 along the axis of the detector itself (axis X).

As it is known by the scientific literature, the release of charge of a beam of charged particles interacting with matter has a profile characterized by a maximum at a certain position along the propagation axis and which is called Bragg peak.

The detection units 2 placed along the propagation direction of the beam then will record a signal variable depending upon their position and, in the specific case, the curve approximates the dose distribution or Bragg distribution. The reconstruction of the dose distribution is within the comprehension of the person skilled in the art which has available a detector according to the present invention.

The signal reading directly by each detection unit 2 is allowed by a reading system 4 comprising a plurality of electric connection elements 9a, each one in contact with the detection unit 2 thereto it refers, and so many analysis modules 9b which acquire the charge signal recorded by said detection unit 2 and return a piece of information in numerical form or as graph having current intensity as a function of time therefrom it is obtained, with techniques known to the person skilled in the art, the charge deposited by the beam of particles on each detection unit 2.

Each analysis module 9b comprises different electronic components depending upon the experimental conditions under which the detector is used; the electronic components of the analysis modules 9b respectively for applications with clinical beams, beams of laser-driven type and microdosimetry measurements will be described in details hereinafter.

Figure 5A:
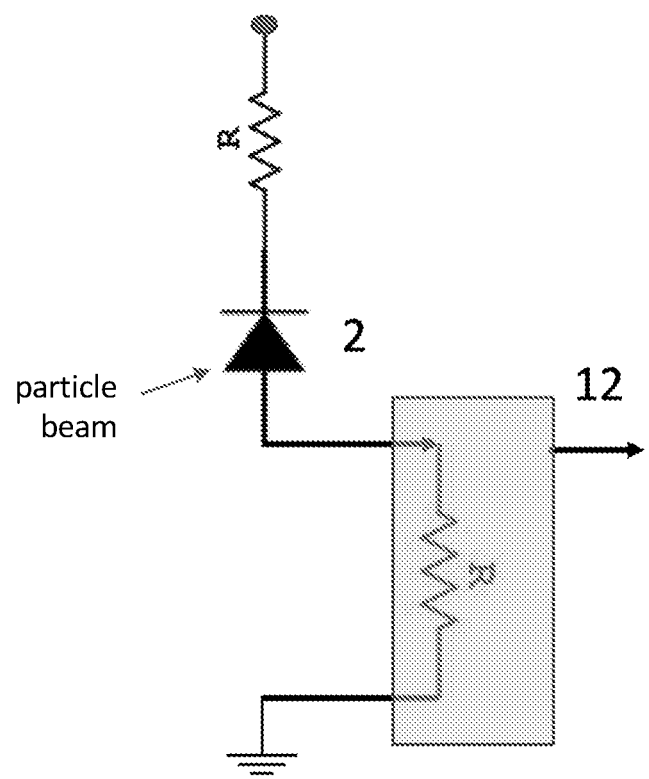
FIG. 5a-5b: circuit diagram of two preferred embodiments of the signal reading module.

In a first embodiment example, the detector is used in the field of the dosimetry with clinical beams that is continuous beams of charged particles generally characterized by fluency over time of about $10^6$–$10^9$ particles/(cm$^2$s). In this case, the electronic circuit at the base of the analysis module 9b is shown in FIG. 5a and comprises a converter of charge into current 12 which receives the signal of the detection unit 2 and returns a number that is proportionate to the charge deposited by the beam of particles on said detection unit. By processing the data processed by the plurality of reading modules 9b, it is possible to reconstruct the curve of dose released depending upon the position along the axis X of the detector, or the Bragg distribution.

In a second embodiment example, the detector 1 is used in the field of the dosimetry with beams of charged particles of laser-driven type, or generated by the laser-matter interaction. This type of beams of particles stands out from the previous one since it is pulsed; the duration of a pulse generally amounts to 100–200 ns. In this case the electronic circuit at the base of the analysis module 9b, as replacement of the charge converter, comprises a digitizer which receives the charge signal of the single detection unit 2 and returns a diagram of the current as a function of time. By integrating the signal recorded for the duration time of the laser pulse, the charge signal deposited by the beam of particles on the detection unit 2 is obtained. Analogously to what said for the first embodiment example, it is possible to obtain the charge release curve as a function of axis X.

In a third embodiment example, the detector is used in the field of microdosimetry with clinical beams. In the field of microdosimetry it is important to reduce as much as possible the fluency values over time with the ideal purpose of observing the behaviour of the interacting single particle.

Figure 5B:
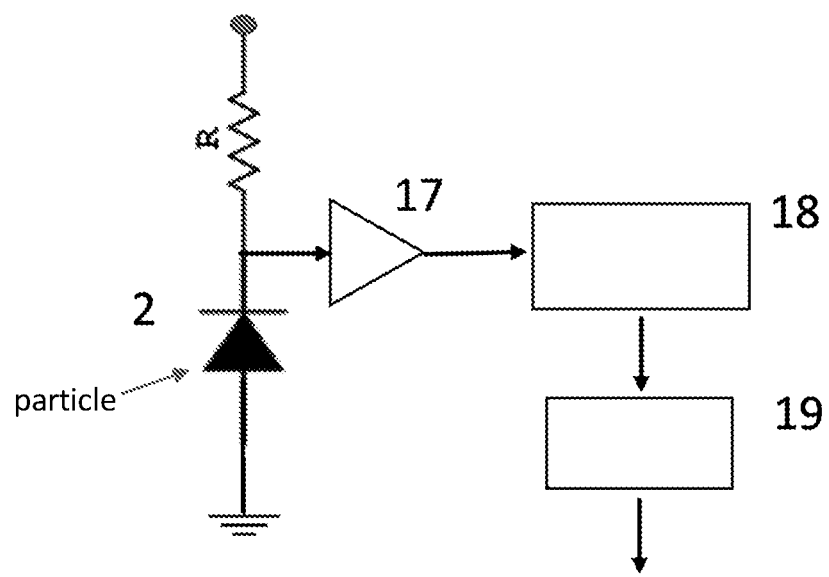

The electronic circuit at the base of the analysis module 9b, shown in FIG. 5b, then comprises a charge pre-amplifier 17, a former 18 and a digitizer 19, so that the signal generated by a single charged particle interacting with the detection unit 2 allows to obtain the current intensity curve as a function of time and, by integrating with the signal acquisition time, it is possible to obtain the deposited charge. Consequently, by processing the signals obtained from the plurality of reading modules, the charge distribution curve as a function of the position along the axis X is obtained.

For all three above-represented operating configurations, by means of analysis techniques known to the person skilled in the art, it is possible to extrapolate information such as the energy release profile, that is proportionate to the charge, and the dose distribution.

To the purpose of the present invention, under the term digitizer an instrument is meant, suitable to convert the analog signal into a digital signal by means of an analog-digital converter, better known as Analog to Digital Converter or ADC; the processing in real time is generally performed by means of a Field Programmable gate Array (FPGA) housed inside thereof.

The detector 1 is used with monoenergetic beams of charged particles with values of incident energy varying from 5 MeV/n up to values of energy higher than 500 MeV/n. For a better operation of the detector, it is preferably to observe the following precautions upon implementing a detector optimized depending upon the beam features.

The number of detection units 2 included in a detector 1 according to the present invention is at least equal to ten. A greater number of detection units allows to reconstruct the dose distribution with a greater spatial resolution to the detriment of a more complex reading system 4. A greater number of detection units 2 further allows to reconstruct the dose distribution, the spatial resolution being equal, for beams of higher-energy charged particles.

Figure 4:
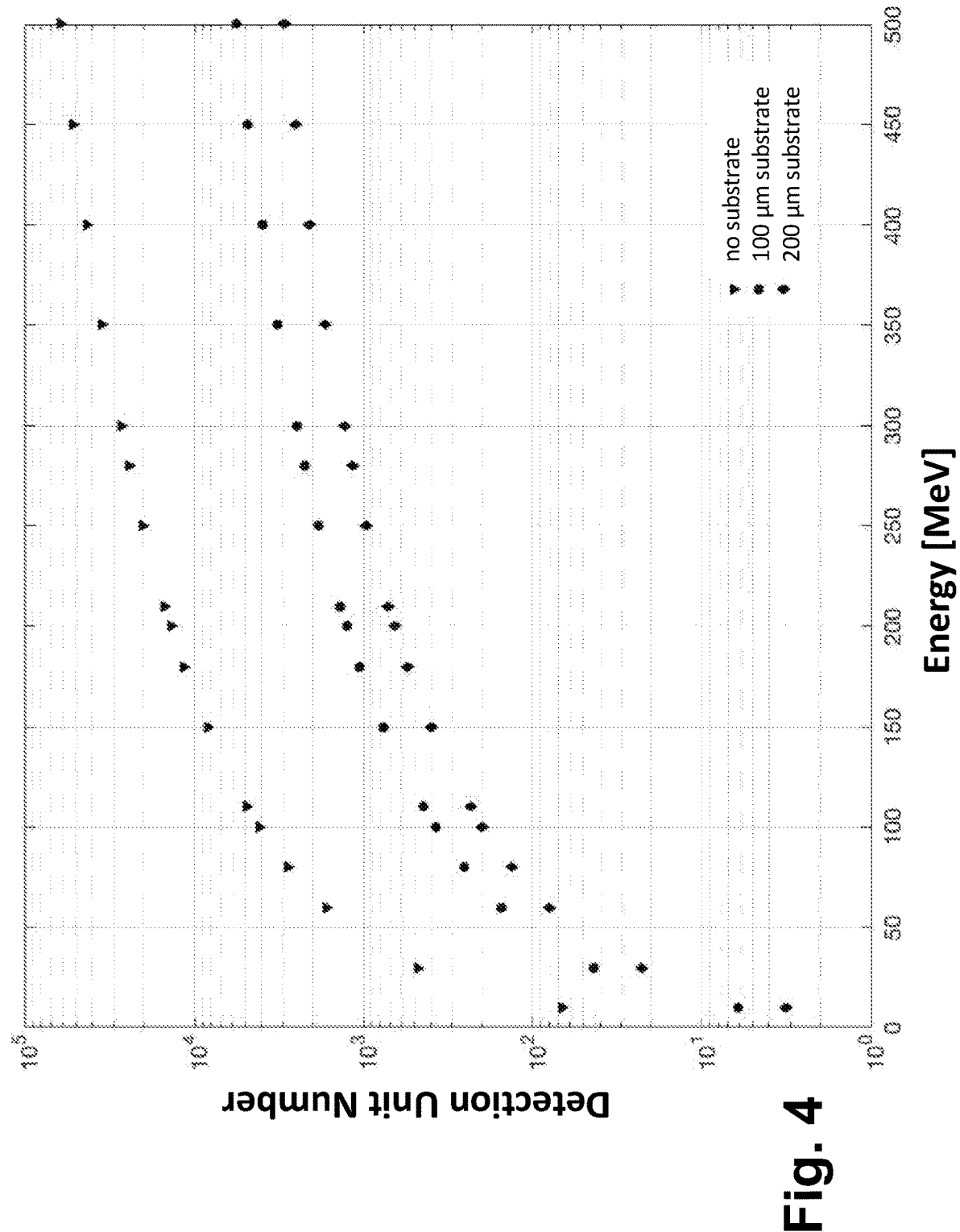
FIG. 4: graph exemplifying the law of scale regulating the number of detection units as a function of the energy of the beam of interacting charged particles.

By supposing to work in air, and not to use absorbers to interpose between one detection unit 2 and the other one, the law adjusting the number of detection units to be used depending upon the energy of the incident protons follows a course analogous to the one shown in FIG. 4.

The data shown in FIG. 4 relate respectively to a detector without substrate, the substrate thereof has a thickness of 100 μm and of 200 μm operating with a beam of protons. By supposing to keep the distance between a detection unit and the subsequent one to the minimum, or to keep a distance amounting to the millimetre, the number of detection units 2 will scale with the penetration depth of the incident particles in the medium, considering the density of the silicon carbide amounting to 3 gr/cm$^3$.

By way of example, a detector operating with beams of protons with incident energy equal to 62 MeV comprises 152 detection units as described above. Analogously, a detector operating with beams of protons with incident energy equal to 250 MeV/n comprises 1836 detection units. A still higher number of detection units 2 makes more complex the implementation of the detector as well as the reading system 4.

To solve this drawback, the detector of the invention 1 can include one or more layers of a tissue-equivalent absorbing material interposed between two adjacent detection units 2.

The need for using a tissue-equivalent material, such as for example

Perspex, is dictated by the fact that the detector is thought for dosimetric applications and then the use of material is preferable having a closest chemical composition to that of the biological tissues and a density comparable to that of water.

The function performed by the layer of tissue-equivalent material consists in degrading the kinetic energy of the incident particles, then by allowing to keep a relatively low number of detection units 2 and at the same time to operate in more than an energic configuration. In other words, the recourse to one or more layers of absorbing materials allows to operate with beams with gradually higher energies by keeping fixed the number of the detection units 2.

The tissue-equivalent material can be made of polymethylmethacrylate (commonly known as PMMA).

The layers of (not represented) absorbing materials generally have a thickness varying depending upon the energy of the incident beam of charged particles: one starts from thicknesses amounting to 10 μm in case of beams of 5 MeV/n until arriving to thicknesses amounting to 50 cm for beams with energies equal to about 500 MeV/n.

Under operating conditions, the detector 1 of the present invention is placed with its own axis at the propagation direction of a beam of charged particles. A collimator is placed between the source of particles and the detector, so as to ensure that the section of the beam falls in the active area of each detection unit of the detector itself.

The collimator diameter is not fixed in advance; on the contrary, the person skilled in the art will be capable of establishing the suitable diameter thereof depending upon the beam emittance, the energy and the type of particles constituting it apart from the geometric features of the detector.

By way of example, the collimator diameter is approximately equal to 1 mm for energy proton beams equal to 62 MeV interacting with a detector comprising 60 detection units for an overall length equal to 30 cm.

The above-described detector 1 allows to perform dosimetric measurements useful in the quality controls performed daily at the proton-therapy centres or under conditions of dose rates amounting to 20 Gy/min as well as in applications relating to beams of high-intensity charged particles produced by the laser-matter interaction and then characterized by dose rates amounting to 3000 Gy/min.

The detector is capable of performing dose distribution measurements and determining the energy of the incident particles in time periods amounting to few seconds with a spatial resolution amounting to tens of μm. The above-mentioned performances allow to reconstruct the distribution of energy linear transfer, better known as Linear Energy Transfer (LET), and then to trace to the biological damage suffered by the tissues surrounding the volume being treated.

The detector of the invention results to be particularly advantageous in terms of resistance to the damage by radiation since it is made of silicon carbide (SiC). The detector further has the advantage of the response speed amounting to few nanoseconds.

Additional advantages are the spatial resolution amounting to tens of pm and the energy resolution which, by way of example, is equal to 0.5% per alfa particles of 5 MeV.

In particular, the experimental observation of an independence of operation of the detector from the energy of the incident beam is reported.

Moreover, the silicon carbide (SiC) has demonstrated to be an optimum material for dosimetric measurements being characterized by a response independent from energy, dose rate and linear with the released dose. On the market there are no solid-state detectors showing such features with detection surfaces larger than square centimetre.

The description of an embodiment example tested under working conditions is shown hereinafter. The response of the detector of the invention as dosimeter was checked with 62-MeV clinic protons at the facility of proton-therapy CATANA ("Centro di AdroTerapia e Applicazioni Nucleari Avanzate") of the "Laboratori Nazionali del Sud" (LNS-INFN).

The used device is a 1 cm$^2$-wide prototype of active area having thickness of the detection unit equal to 10 μm.

The reading system 4 is made operative through a polarization network which determines the emptying of the active region of each detection unit and a current tension converter associated thereto, to acquire the current signal.

The detector was subjected to a direct ion radiation, with a beam of protons, positioned at the isocentre; the beam of protons passing through a collimator having a diameter of 8 mm so as to centre the sensitive surface of each detection unit.

In order to characterize suitably the response of the detector so that it can be used for applications of dosimetric and micro-dosimetric type, a series of preliminary tests were performed upon varying the released dose, the fluency of the incident particles and the energy of the latter. The charge collected by the detector showed a good independence from the dose rate with a reproducibility within 2%.

Figure 6:
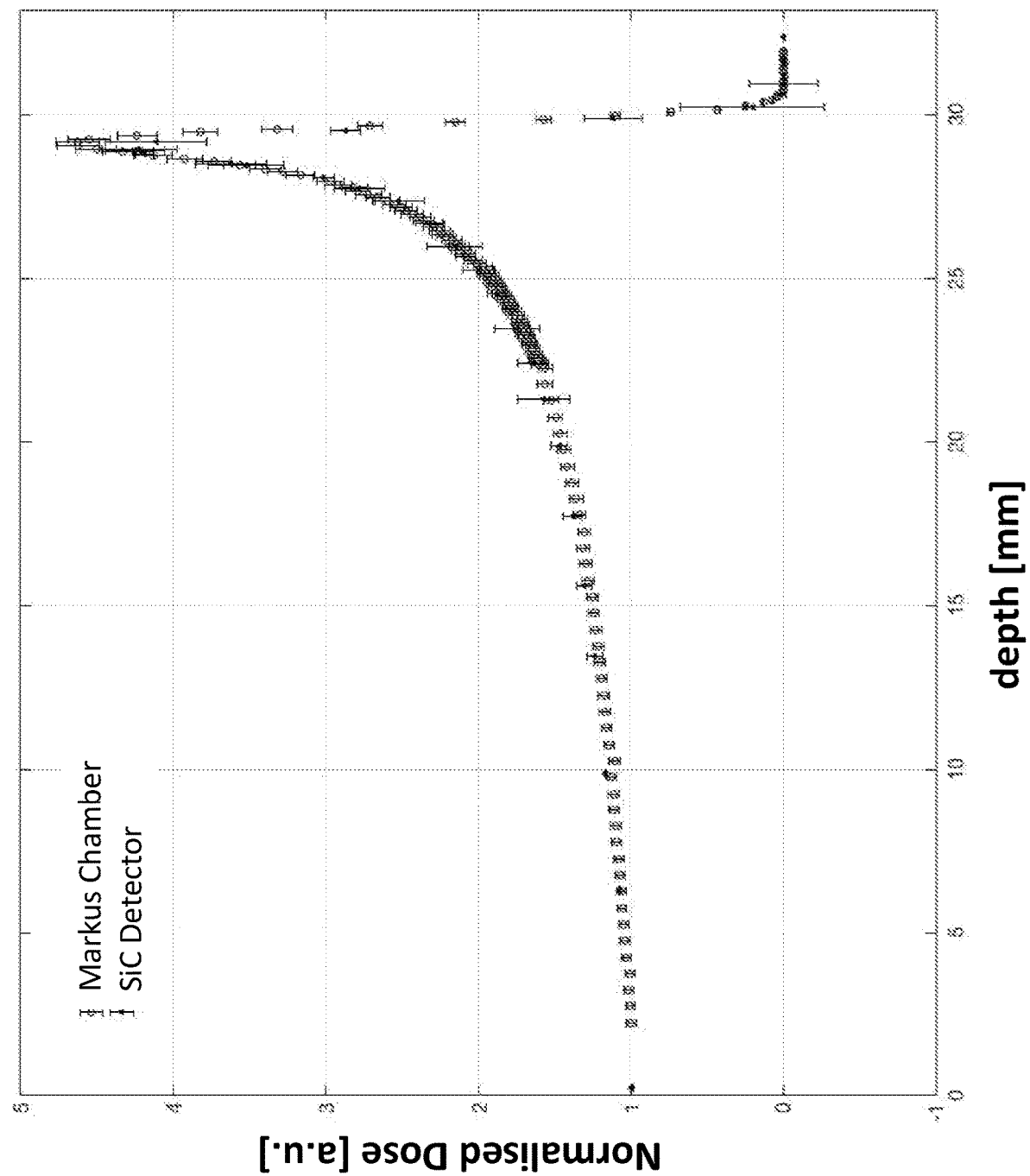
FIG. 6: comparison graph between the response of the detector of the invention and an ionization chamber of Markus type.

With the purpose of investigating the energy dependence in the response of the detector, absorbers made of PMMA, having different thickness, were placed in front of the detector, by obtaining the wished results. FIG. 6 shows the comparison graph between the response of the detector of the invention and an ionization chamber of Markus type.

The invention claimed is:
1. A dosimetry detector comprising:
   a main body (3) having a main dimension along a longitudinal axis (X) and a surface portion (5) transparent to a beam of charged particles so as to allow the beam of charged particles to pass therethrough;

at least ten detection units (2) arranged in series along the longitudinal axis (X);

a signal reading system (4) comprising a plurality of electric connecting elements (9a), each one in contact with a respective detection unit (2), and of analysis modules (9b), which acquire the charge signal recorded by each detection unit (2) and process the relative dose distribution;

wherein the beam of charged particles passing through the transparent surface portion (5) of the main body (3) continues its own path coming across the at least ten detection units (2), along the propagation direction, wherein the at least ten detection units (2) are made of silicon carbide;

wherein the main body (3) is provided with two openings (6, 7), respectively adapted to inlet and outlet a tissue-equivalent filling gas, and which comprises a variable pressure flow system, connected to said two openings (6, 7), to obtain and keep constant the pressure of the filling gas, and wherein said tissue-equivalent gas is dimethyl-ether.

2. The detector according to claim 1, wherein the main body (3) is made of aluminum.

3. The detector according to claim 1, wherein each detection unit (2) comprises an active area ranging from 1 mm$^2$ to 25 cm$^2$ and a thickness ranging from 1 to 100 μm.

4. The detector according to claim 1, wherein the at least ten detection units (2) are placed at a distance from each other ranging from two or more millimeters to tens of centimeters.

5. The detector according to claim 1, wherein each detection unit (2) comprises:
- a substrate of silicon carbide (10) having two main dimensions to form one first and one second face, the substrate comprising an n-type doping;
- an epitaxial layer (11) comprising an n-type doping placed at said first substrate face (10) and having a thickness comprised between 10 μm and 100 μm and with a dopant concentration amounting to $5-8\cdot10^{13}$/cm$^3$;
- a layer (13) comprising a p+-type doping placed on said epitaxial layer (11) having a thickness comprised between 0.2 μm and 1 μm and a dopant concentration amounting to $10^{18}-10^{19}$/cm$^3$;
- a layer (14) comprising an n+-type doping interposed between the substrate (10) and the epitaxial layer (11), adapted to the electric contact therebetween, having a thickness comprised between 0.2 μm and 1 μm and a dopant concentration amounting to $10^{18}$/cm$^3$; and
- two metal layers (15, 15'), with thickness comprised between 0.05 μm and 0.1 μm respectively on the second substrate face (10) and above the layer (13), comprising a p+-type doping.

6. The detector according to claim 1, wherein each detection unit (2) comprises:
- a substrate of silicon carbide (10) having two main dimensions to form one first and one second face, the substrate comprising a p-type doping;
- an epitaxial layer (11) comprising a p--type doping placed at said first substrate face (10) and having a thickness comprised between 10 μm and 100 μm and with a dopant concentration amounting to $5-8\cdot10^{13}$/cm$^3$;
- a layer (13) comprising an n+-type doping placed on said epitaxial layer (11) having a thickness comprised between 0.2 μm and 1 μm and a dopant concentration amounting to $10^{18}-10^{19}$/cm$^3$;
- a layer (14) comprising a p+-type doping interposed between the substrate (10) and the epitaxial layer (11), adapted to the electric contact therebetween, having a thickness comprised between 0.2 μm and 1 μm and a dopant concentration amounting to $10^{18}$/cm$^3$; and
- two metal layers (15, 15'), with thickness comprised between 0.05 μm and 0.1 μm respectively on the second substrate face (10) and above the layer (13) comprising an n+-type doping.

7. The detector according to claim 1, wherein the analysis module (9b) comprises an electronic circuit in turn comprising a converter of charge into current (12) which receives the signal of the respective detection unit (2) and returns a number that is proportionate to the charge deposited by the beam of particles on said detection unit.

8. The detector according to claim 1, wherein the analysis module (9b) comprises an electronic circuit in turn comprising a digitizer which receives the charge signal of the single detection unit (2) and returns a diagram of the current as a function of time.

9. The detector according to claim 1, wherein the analysis module (9b) comprises an electronic circuit comprising a charge pre-amplifier (17), a former (18) and a digitizer (19) so that the signal generated by a single charged particle interacting with the detection unit (2) allows to obtain a current intensity curve as a function of time and, by integrating with the signal acquisition time, it is possible to obtain the deposited charge.

10. An apparatus for dosimetric measurements, comprising a detector according to claim 1.

11. The apparatus according to claim 10, further comprising a collimator placed in front of the detector so as to ensure that the section of the beam of particles falls in an active area of each detection unit (2) of the detector itself.

12. Use of the detector according to claim 1 for determining the spatial profile of the charge release of a beam of charged particles interacting therewith.

13. Use of the detector according to claim 1 for determining the spatial profile of the charge release of single charged particles interacting therewith.

* * * * *